(12) United States Patent
Sasaki et al.

(10) Patent No.: US 9,771,944 B2
(45) Date of Patent: Sep. 26, 2017

(54) MOTOR CONTROLLER AND MOTOR CONTROL METHOD

(75) Inventors: Ryuta Sasaki, Osaka (JP); Yasuyuki Yokouchi, Osaka (JP); Yasushi Kato, Kyoto (JP); Toru Tazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 14/382,239

(22) PCT Filed: Sep. 13, 2012

(86) PCT No.: PCT/JP2012/005849
§ 371 (c)(1),
(2), (4) Date: Aug. 29, 2014

(87) PCT Pub. No.: WO2013/128505
PCT Pub. Date: Sep. 6, 2013

(65) Prior Publication Data
US 2015/0064023 A1    Mar. 5, 2015

(30) Foreign Application Priority Data
Mar. 2, 2012    (JP) .................................. 2012-046204

(51) Int. Cl.
*F04D 27/00*    (2006.01)
*F04D 25/08*    (2006.01)
(Continued)

(52) U.S. Cl.
CPC ........... *F04D 27/004* (2013.01); *F04D 25/06* (2013.01); *F24F 7/007* (2013.01); *F24F 11/001* (2013.01);
(Continued)

(58) Field of Classification Search
CPC ........ F04D 27/004; F04D 25/06; F04D 25/08; F04D 27/00; F04D 15/0066
(Continued)

(56) References Cited

U.S. PATENT DOCUMENTS 4,638,233 A * 1/1987 Erdman .................... H02P 6/08
                                                   318/254.1
4,648,551 A    3/1987 Thompson et al.
(Continued)

FOREIGN PATENT DOCUMENTS

EP    1 990 584 A2    11/2008
FR    2 925 951 A1    7/2009
(Continued)

OTHER PUBLICATIONS

Extended European Search Report in corresponding European Application No. 12870016.8, dated Feb. 13, 2015, 6 pages.
(Continued)

*Primary Examiner* — Peter J Bertheaud
(74) *Attorney, Agent, or Firm* — Brinks Gilson & Lione (57) ABSTRACT

A motor controller of the present invention comprises units which obtain information indicative of a motor speed ($\omega$) and information indicative of motor torque (T), an air flow calculation section which calculates an air flow (Q) of a fan based on the motor speed ($\omega$) and the motor torque (T); and a speed command generation section which generates a speed command ($\omega^*$) of a motor such that the air flow (Q) coincides with the predetermined air flow command ($Q^*$).

11 Claims, 7 Drawing Sheets

(51) Int. Cl.
*H02P 6/06* (2006.01)
*F24F 11/00* (2006.01)
*F04D 25/06* (2006.01)
*F24F 7/007* (2006.01)
*H02P 23/14* (2006.01)
*F24F 11/04* (2006.01)

(52) U.S. Cl.
CPC ...... *F24F 11/0001* (2013.01); *F24F 11/0079* (2013.01); *F24F 11/04* (2013.01); *H02P 6/06* (2013.01); *H02P 23/14* (2013.01); *F04D 25/08* (2013.01); *F04D 27/00* (2013.01); *F05D 2200/12* (2013.01); *F05D 2200/14* (2013.01); *F05D 2270/02* (2013.01); *F05D 2270/3061* (2013.01); *Y02B 30/746* (2013.01)

(58) Field of Classification Search
USPC ...................... 417/20, 22, 42, 44.1
See application file for complete search history.

(56) References Cited

U.S. PATENT DOCUMENTS

| | | | | |
|---|---|---|---|---|
| 5,463,299 A | * | 10/1995 | Futami | H02P 6/06 318/400.13 |
| 5,861,728 A | * | 1/1999 | Tazawa | H02P 21/18 318/727 |
| 6,087,734 A | | 7/2000 | Maeda et al. | |
| 6,512,341 B2 | * | 1/2003 | Matsushiro | H02P 6/085 318/400.01 |
| 6,583,593 B2 | * | 6/2003 | Iijima | H02P 6/183 318/400.02 |
| 6,844,693 B2 | * | 1/2005 | Tazawa | H02P 7/2805 318/561 |
| 7,456,597 B2 | * | 11/2008 | Kanamori | H02P 6/08 318/599 |
| 7,525,262 B2 | * | 4/2009 | Carow | D06F 58/28 318/254.1 |
| 8,297,068 B2 | * | 10/2012 | Yokouchi | F04D 27/004 62/239 |
| 9,214,884 B2 | * | 12/2015 | Sonoda | H02P 21/0035 |
| 2003/0011342 A1 | | 1/2003 | Eichorn | |
| 2010/0101265 A1 | | 4/2010 | Yokouchi et al. | |

FOREIGN PATENT DOCUMENTS

| | | |
|---|---|---|
| JP | 63-186594 A | 8/1988 |
| JP | 06-235514 A | 8/1994 |
| JP | 07-260903 A | 10/1995 |
| JP | 3738685 B2 | 11/2005 |
| WO | WO 2008/117515 A1 | 10/2008 |

OTHER PUBLICATIONS

International Search Report in corresponding International Application No. PCT/JP2012/005849, dated Dec. 18, 2012, 2 pages.

* cited by examiner

MOTOR CONTROLLER AND MOTOR CONTROL METHOD

This application is a 371 application of PCT/JP2012/005849 having an international filing date of Sep. 13, 2012, which claims priority to JP2012-046204 filed on Mar. 2, 2012, the entire contents of which are incorporated herein by reference.

TECHNICAL FIELD

The present invention relates to a motor controller and a motor control method. Particularly, the present invention relates to an air flow control method for a fan motor such as an air conditioner, which performs motor control, or a blower such as a ventilation fan.

BACKGROUND ART

In recent years, in an air conditioning system of a ventilation fan or an air conditioner, to optimize a status of a room or the air conditioning system, it is required that an air flow (air volume) be controlled to become a predetermined air flow value even though a static pressure changes due to clogging of a filter or a state of a vent provided in an air outlet.

For example, as a technique for controlling the air flow such that the air flow becomes the predetermined air flow value, for example, Patent Literature 1 is known. According to the conventional technique disclosed in Patent Literature 1, a command speed of a motor for driving a fan is calculated from a formula (1).

$$S^* = S + K \times (S - Sa) \quad (1)$$

S* indicates the command speed of the motor, S indicates a motor speed, Sa indicates a target motor speed, and K indicates a gain. The target motor speed Sa is calculated from a formula (2).

$$Sa = \sum_{n=0}^{j} \left( \sum_{m=0}^{i} (k_{nm} T^n Q^{*m}) \right) \quad (2)$$

T indicates motor torque, Q* indicates a predetermined air flow value, $k_{nm}$ (n=0, 1, 2, . . . , j, m=0, 1, 2, . . . , i) indicates a constant, i indicates a finite value, and j indicates a finite value. The formula (2) represents a relationship in which the motor speed required to allow the air flow to become the predetermined air flow command Q* in a case where the motor torque is T is Sa.

Hereinafter, a description will be given of control of the motor in the case where a motor controller disclosed in Patent Literature 1 controls the air flow of the fan such that the air flow becomes the predetermined air flow value Q*, with reference to FIG. 7.

Figure 7:
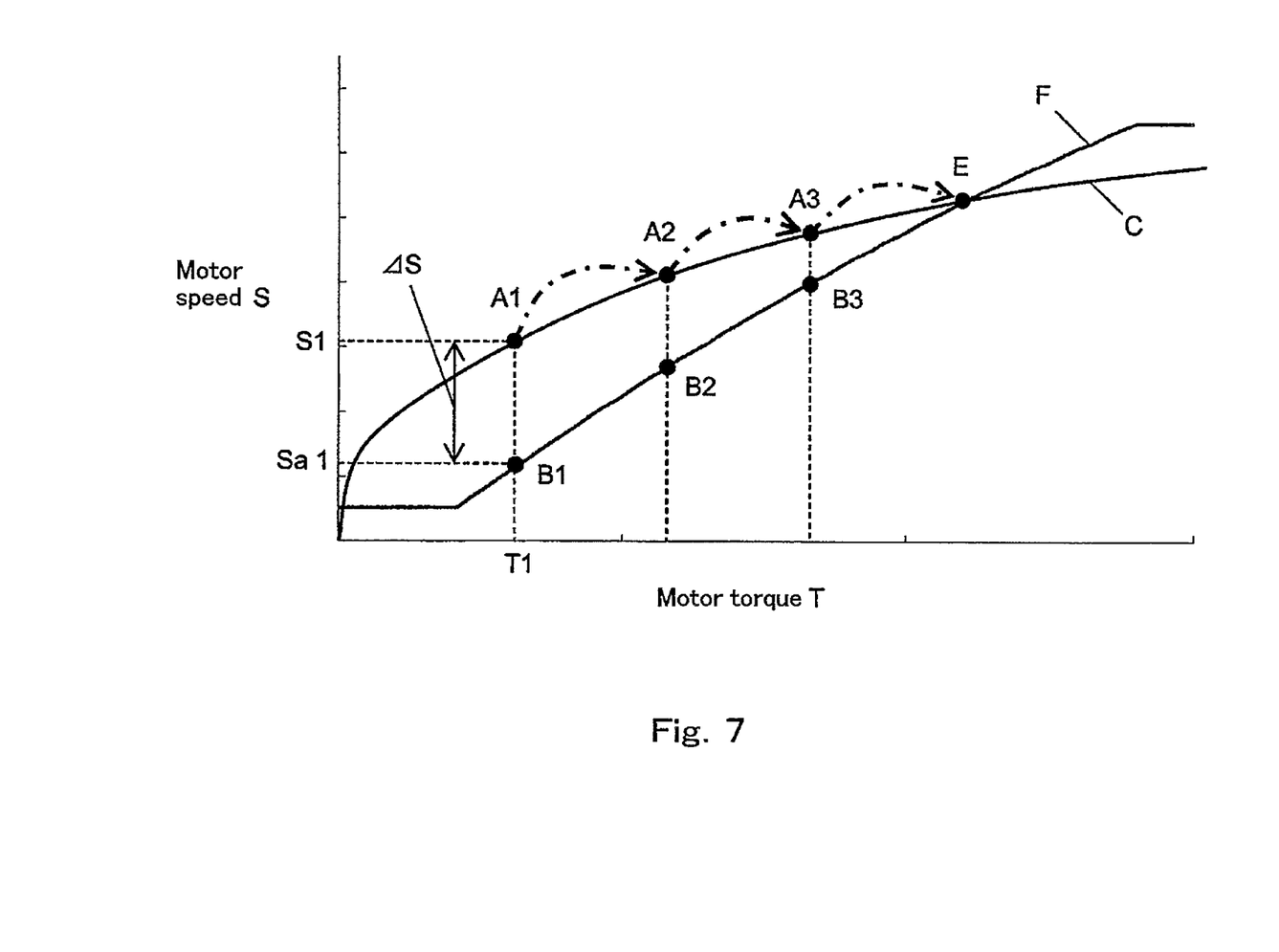
FIG. 7 is a view showing air flow control performed by a motor controller according to a conventional technique.

In FIG. 7, a curve F indicates a motor speed and motor torque at which the air flow becomes the predetermined air flow value Q* (hereinafter this curve will be referred to as "constant air flow curve"). A curve C indicates an environment curve unique to an air conditioning environment in which the motor is mounted (hereinafter will be referred to as "air conditioning environment curve").

It is supposed that the operation point of the motor is a point A1 on the air conditioning environment curve C. In this case, the target motor speed Sa calculated from the formula (2) is a motor speed Sa1 at a point B1 on the constant air flow curve F at which motor torque T1 corresponding to the operation point A1 is obtained.

According to the formula (1), a difference (indicated by ΔS in FIG. 7) obtained by subtracting Sa1 from the motor speed S1 is multiplied by the gain K and the motor speed S1 is added to the resulting value, thereby resulting in a command speed S* (not shown) of the motor. Then, the command speed S* is output. The motor speed is controlled in accordance with the command speed S*, and thereby the operation point is shifted.

At the shifted operation point, a new command speed S* is calculated according to the formula (2) and the formula (1). This is repeated. The operation point is shifted to an operation point A2 and then to an operation point A3 in FIG. 7. Finally, obtained is an operation point at which the difference between the motor speed S and the target motor speed Sa becomes zero, i.e., an intersection E of the air conditioning environment curve C and the constant air flow curve F.

As described above, the motor controller disclosed in Patent Literature 1 is configured to calculate a compensation value required for the motor speed using the motor torque and the predetermined air flow value and the command speed is output based on the compensation value. This makes it possible to control the air flow such that the air flow becomes the predetermined air flow value, even if the predetermined air flow value changes or the static pressure changes due to clogging of the filter or opening/closing of the vent.

CITATION LIST

Patent Literature

Patent Literature 1: International Publication No. 2008/117515

SUMMARY OF INVENTION

Technical Problem

In the conventional technique disclosed in Patent Literature 1, how the motor speed changes and converges depends on the value of the gain K of the formula (1). For example, in a case where the value of the gain K is small, the changing magnitude of the command speed S* with respect to a calculation cycle is small, and therefore, it takes time for the motor speed to converge.

On the other hand, in a case where the value of the gain K is large, the changing magnitude of the calculated command speed S* is large. The motor speed changes back and forth, crossing a convergence point E in FIG. 7 (the motor speed repeatedly exceeds and falls below the convergence point E). Thus, the motor speed does not stably converge at the convergence point E. To avoid this, an experiment is conducted while changing the value of the gain K to find an optimal value.

However, the optimal value of the gain K is varied depending on the air conditioning environment in which the motor is mounted. For example, in some cases, a gain which is sufficiently stable in an air conditioning environment of a virtual model becomes excessive and the operation point does not stably converge, in a real air conditioning environment provided in a house and changed due to clogging of the air filter or opening/closing of the vent. In light of this, assuming a change in the air conditioning environment to be used, it is desired that the gain K be set to a sufficiently small value so that the fan can operate stably in an operation range in which the motor speed tends to fluctuates unstably.

However, if the value of the gain K is small, it takes time for the motor speed to converge. Therefore, when the predetermined air flow value is changed significantly, it takes a long time for the air flow to converge at a new predetermined air flow value, in some cases.

The present invention is directed to solving the above described problem associated with the prior art, and provides a motor controller and a motor control method which allow the air flow of a fan to track a predetermined air flow value at a high speed and to stably converge at the predetermined air flow value, even when the predetermined air flow value changes significantly.

Solution To Problem

According to a first aspect of the present application, there is provided a motor controller for controlling a motor which drives a fan, the motor controller comprising: an air flow calculation section which obtains information indicative of a motor speed and information indicative of motor torque and calculates an air flow of the fan based on the motor speed and the motor torque; and a speed command generation section which generates a speed command of the motor based on a comparison calculation value of the air flow and a predetermined air flow command and by using a ratio of the predetermined air flow command with respect to the air flow such that the air flow coincides with the predetermined air flow command. According to a second aspect of the present invention, in the motor controller according to the first aspect, the speed command generation section generates the speed command by using the ratio of the predetermined air flow command with respect to the air flow when the comparison calculation value falls outside a first predetermined range; and the speed command generation section generates the speed command by using a difference between the air flow and the predetermined air flow command when the comparison calculation value falls within the first predetermined range.

According to a third aspect of the present application, in the motor controller according to the first aspect, the speed command generation section generates as the speed command a value obtained by multiplying the motor speed by the ratio of the predetermined air flow command with respect to the air flow, or a value obtained by multiplying the speed command output at a previous time by the ratio of the predetermined air flow command with respect to the air flow, when the comparison calculation value falls outside the first predetermined range.

According to a fourth aspect of the present invention, the motor controller according to the first aspect, further comprises a motor driving control section which generates a signal used for controlling a driving voltage given to the motor such that the motor speed coincides with the speed command.

According to a fifth aspect of the present application, in the motor controller according to the first aspect, the speed command generation section generates the speed command by using a value obtained by integrating a difference between the air flow and the predetermined air flow command, when the comparison calculation value falls within the first predetermined range.

According to a sixth aspect of the present application, in the motor controller according to the first aspect, the speed command generation section generates the speed command by using a value which is a sum of the motor speed and a value obtained by multiplying by a gain, a difference between the air flow and the predetermined air flow command, when the comparison calculation value falls within the first predetermined range.

According to a seventh aspect of the present application, in the motor controller according to the first aspect, the speed command generation section compensates the speed command such that a difference between the speed command and the motor speed falls within a second predetermined range, when the difference between the speed command and the motor speed falls outside the second predetermined range.

According to an eighth aspect of the present application, in the motor controller according to the first aspect, the speed command generation section compensates the speed command such that the speed command coincides with the speed command output at a previous time, when a difference between the motor torque obtained at a present time and the motor torque obtained at a previous time falls within a third predetermined range.

According to a ninth aspect of the present application, in the motor controller according to the first aspect, the speed command generation section contains a minimum speed command and a maximum speed command, and outputs the speed command limited within a range between the minimum speed command and the maximum speed command.

According to a tenth aspect of the present application, in the motor controller according to the first aspect, the air flow calculation section calculates the air flow as a product of the motor speed and a polynomial of variables in which the motor torque is divided by a square of the motor speed.

According to an eleventh aspect of the present application, in the motor controller according to the first aspect, the motor speed is obtained by a first detector which detects the motor speed.

According to a twelfth aspect of the present application, in the motor controller according to the first aspect, the motor torque is obtained by a second detector which detects a current flowing in the motor.

According to a thirteenth aspect of the present application, there is provided a method of controlling a motor which drives a fan, the method comprising: obtaining at least one of information indicative of a motor speed and information indicative of motor torque; calculating an air flow of the fan based on the motor speed and the motor torque; and generating a speed command of the motor based on a comparison calculation value of the calculated air flow and a predetermined air flow command, and by using a ratio of the predetermined air flow command with respect to the air flow such that the air flow coincides with the predetermined air flow command.

Advantageous Effects of Invention

A motor controller of the present invention generates a speed command which is equal to a motor speed which realizes an air flow value of a predetermined air flow command, when the motor controller determines that a difference between an air flow calculated by an air flow calculation section and the predetermined air flow command is large. This allows the air flow to track a predetermined air flow value at a high speed and to stably converge at the predetermined air flow value.

DETAILED DESCRIPTION OF THE PREFERRED EMBODIMENTS (View Point of the Present Invention)

In order to allow the air flow (air volume) of a fan to track a predetermined air flow value at a high speed and stably converge at the predetermined air flow value even when the predetermined air flow value changes significantly, inventors of the present application focused an attention on a rule in which the air flow is generally proportional to a rotational speed in a blower device such as the fan or a blower, as a rule derived from similarity of flows in fluid dynamics. Specifically, according to this rule, a relationship is satisfied, in which the ratio of a predetermined air flow command (commanded air flow) with respect to the air flow is equal to the ratio of "motor speed which realizes an air flow value of the predetermined air flow command" with respect to the motor speed. Therefore, the inventors decided as a speed command, a value obtained by multiplying the motor speed by the ratio of the predetermined air flow command with respect to the air flow (product of the motor speed and the ratio of the predetermined air flow command with respect to the air flow). In this configuration, the speed command is changed into the value of the motor speed which realizes the air flow value of a new predetermined air flow command even when the predetermined air flow command changes significantly. This allows the air flow to track the predetermined air flow command at a high speed.

Specifically, a motor controller of the present invention is a motor controller for controlling a motor which drives a fan, the motor controller comprising: an air flow calculation section which calculates an air flow of the fan based on a motor speed and motor torque; and a speed command generation section which generates a speed command of the motor based on a comparison calculation value of the air flow and a predetermined air flow command and by using a ratio of the predetermined air flow command with respect to the air flow such that the air flow coincides with the predetermined air flow command.

In this configuration, the generation method of the speed command is changed depending on the magnitude of the comparison calculation value of the air flow and the predetermined air flow command. When the comparison calculation value falls outside the first predetermined range, the speed command which is equal to the "motor speed which realizes the air flow value of the predetermined air flow command" is generated by multiplying the motor speed by the ratio of the predetermined air flow command with respect to the air flow, as described above.

On the other hand, when the comparison calculation value falls within the first predetermined range, the motor speed is compensated based on an integral calculation value of the difference between the air flow and the predetermined air flow command, i.e., feedback control by integral compensation.

In this case, a control gain is set to a small value to make sensitivity of the control low, and thus the speed command is allowed to change gently.

Hereinafter, embodiments of the present invention will be described with reference to drawings. Note that the present invention is not limited by the embodiments described below.

(Embodiment 1)

Figure 1:
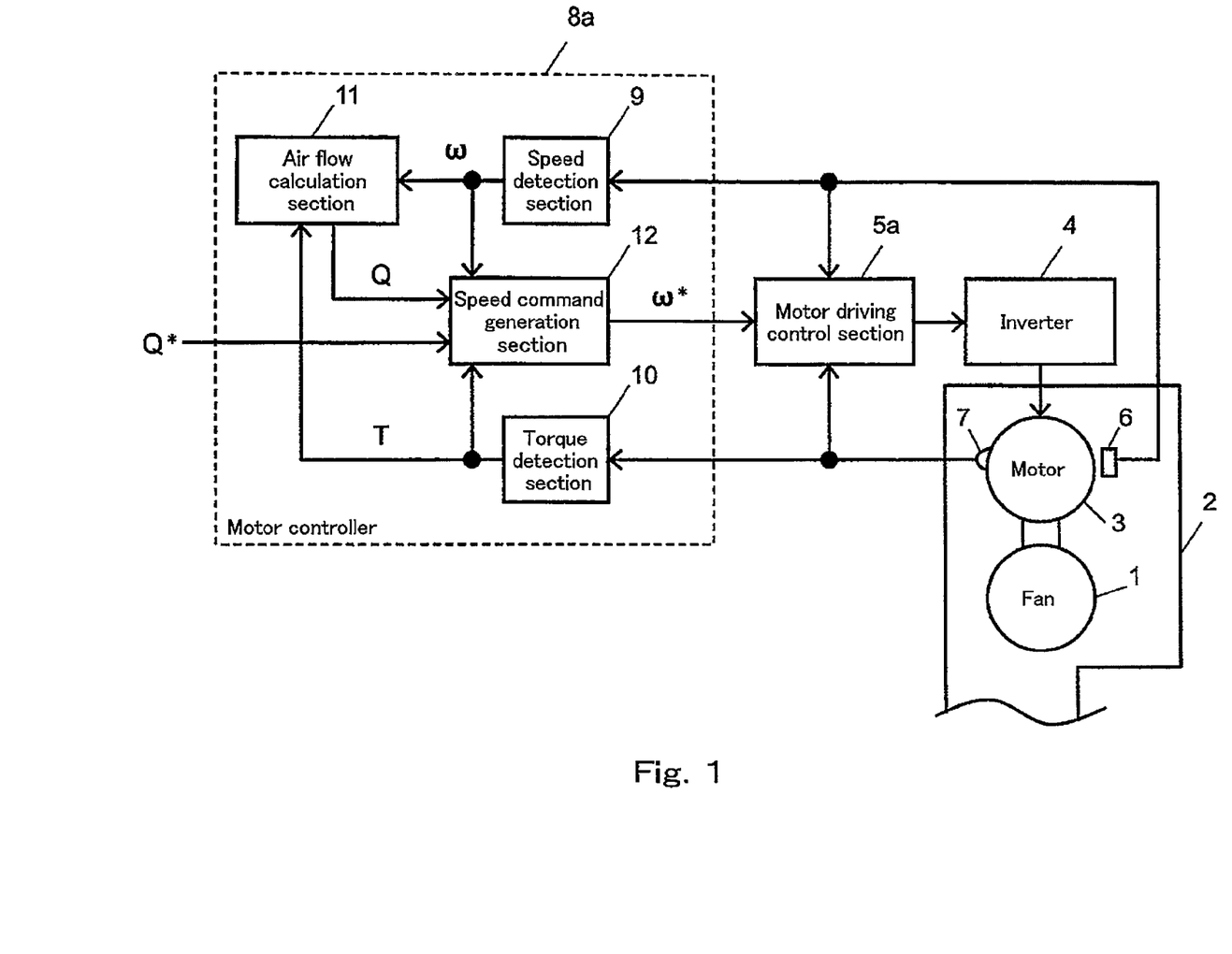
FIG. 1 is a block diagram showing the exemplary configuration of a motor control system including a motor controller according to Embodiment 1 of the present invention.

FIG. 1 is a block diagram showing the exemplary configuration of a motor control system including a motor controller according to Embodiment 1 of the present invention. The motor control system of FIG. 1 includes a fan 1, an air flow passage 2 through which air blown by the fan 1 flows, a motor 3 which drives the fan 1, an inverter 4 which supplies electric power to the motor 3, a motor driving control section 5a which controls the inverter 4, a position detector 6 which detects the position of a rotor of the motor 3, a current detector 7 which detects a current of the motor 3, and a motor controller 8a which controls air flow (air volume) Q of the fan 1 such that the air flow Q becomes a predetermined air flow command Q*.

The motor controller 8a includes a speed detection section 9 which detects a motor speed ω from the output signal of the position detector 6, a torque detection section 10 which detects motor torque T from the output signal of the current detector 7, an air flow calculation section 11 which calculates the air flow Q of the fan 1 based on the motor speed ω and the motor torque T, and a speed command generation section 12 which generates a speed command ω* of the motor 3 such that the air flow Q coincides with the predetermined air flow command Q*. The speed detection section 9 may detect the motor speed ω using other known means (e.g., rotation meter, speed sensor, etc.). The torque detection section 10 may detect the motor torque T using other known means (e.g., torque meter, etc.).

Next, the operation and constituents of the sections in the example of FIG. 1 will be described. The fan 1 supplies air to a desired location through the air flow passage 2. The motor 3 rotates in a state in which it is joined to the fan 1, to drive the fan 1. The structure of the motor 3 is not particularly limited, and may be, for example, a brushless DC motor. Or, other motor, such as an induction motor or a DC motor with brush may be used.

The inverter 4 performs semiconductor switching in accordance with a control signal received from the motor driving control section 5a, converts a DC voltage from an electric power supply (not shown) into an AC voltage and supplies the AC voltage to the motor 3. A switching configuration or switching method within the inverter 4 is not particularly limited so long as they are adapted to an aim of driving the motor 3.

The motor driving control section 5a calculates by speed control a driving voltage for allowing the motor speed ω to track a speed command ω* received from the motor controller 8a, and outputs a control signal for causing the inverter 4 to supply this driving voltage. The position detector 6 is attached to the motor 3, and outputs a signal corresponding to the position of the rotor of the motor 3.

In a case where the position or speed of the rotor can be detected by estimation, the position detector 6 may be omitted. In the present embodiment, the current detector 7 directly detects a phase current value of the motor and outputs a signal corresponding to the phase current value. The current detector 7 may detect the current in any location so long as the motor torque can be estimated. For example, the current detector 7 may be inserted into a DC line (not shown) connected to the inverter 4 and detect the motor current.

The operation and constituents of sections of the motor controller 8a will be described. The speed detection section 9 calculates the motor speed ω based on the output signal of the position detector 6. The speed detection section 9 may calculate the motor speed ω by estimation using the motor current or the driving voltage, without using the output signal of the position detector 6. The torque detection section 10 calculates the motor torque T based on the output signal of the current detector 7.

Unlike the configuration of FIG. 1, the speed detection section 9 and the torque detection section 10 need not be placed within the motor controller 8a. In a case where the speed detection section 9 and the torque detection section 10 are placed outside the motor controller 8a, they output the calculated motor speed ω and the calculated motor torque T to the motor controller 8a.

The air flow calculation section 11 assigns the motor speed ω and the motor torque T to the formula (3) to calculate the air flow Q of the fan 1. The formula (3) represents the relationship in which the air flow of the fan 1 is Q when the motor speed of the motor 3 is ω and the motor torque of the motor 3 is T.

$$Q = \sum_{n=0}^{i} \left\{ K_n \cdot \left(\frac{\omega_0}{\omega}\right)^{2n-1} \cdot T^n \right\} \quad (3)$$

$K_n$ (n=0, 1, 2, . . . , i) indicates a constant, i indicates a finite value, and $\omega_0$ indicates a particular motor speed.

Next, basis for the formula (3) and how to derive the formula (3) will be described.

Initially, an experiment is conducted, in which a particular fan is driven at a particular motor speed $\omega_0$ by the motor 3. In this case, when the air flow and motor torque in a case where the pressure in the air flow passage accommodated with this fan is changed are $Q_0$ and $T_0$, respectively, the relationship between $Q_0$ and $T_0$ is approximated as the formula 4.

$$Q_0 = \sum_{n=0}^{i} (K_n \cdot T_0^n) \quad (4)$$

$K_n$ (n=0, 1, 2, . . . , i) indicates a constant, and i indicates a finite value. By deriving the formula (3) described below, $K_n$ and i in the formula (4) coincide with $K_n$ and i in the formula (3), respectively.

An approximation method for deriving the formula (4) is not particularly limited. For example, a least square method, a regression analysis, or the like is used. i indicates the order of an approximation formula. Approximation accuracy and calculation accuracy of the air flow are varied depending on the value of i.

Next, how the formula (3) is derived from the formula (4) will be described. In general, in a fan or a blower, there exists a rule in which the air flow is proportional to the rotational speed of the fan under the same pressure loss conditions, and a rule in which shaft power is proportional to a cube of the rotational speed of the fan, due to similarity of flows.

When the fan and the shaft of the motor are joined together without a deflection or detachment, it can be supposed that the rotational speed of the fan is equal to that of the motor speed, and the shaft power of the fan is equal to a motor output (=motor speed×motor torque). Therefore, the following formulas (5) and (6) are satisfied.

$$\frac{Q}{Q_0} = \frac{\omega}{\omega_0} \quad (5)$$

$$\frac{T \cdot \omega}{T_0 \cdot \omega_0} = \left(\frac{\omega}{\omega_0}\right)^3 \quad (6)$$

The formula (6) can be transformed into the following formula (7).

$$\frac{T}{T_0} = \left(\frac{\omega}{\omega_0}\right)^2 \quad (7)$$

The formula (5) and the formula (7) represent the relationship in which when the motor speed at which the particular fan is driven is changed from $\omega_0$ into ω, the air flow changes from $Q_0$ into Q and the motor torque changes from $T_0$ into T. By applying the formula (5) and the formula (7) to the formula (4), the above formula (3) is derived.

As described above, by conducting only the experiment in which the fan is driven at the particular motor speed $\omega_0$ and by using in the formula (3), the constant $K_n$ of the approximation formula (4) thus obtained, the air flow Q in the case where the same fan is driven at a desired motor speed ω can be calculated.

The air flow Q may be calculated without using the formula (3). For example, the relationship among the air flow Q, the motor speed ω and the motor torque T in a case where the pressure in the air flow passage is changed is found by conducting an experiment, and a formula (8) which approximates this relationship may be used.

$$Q = \sum_{g=0}^{j} \left\{ \sum_{h=0}^{i} (K_{gh} \cdot \omega^h \cdot T^g) \right\} \quad (8)$$

$K_{gh}$ (g=0, 1, 2, . . . , j, h=0, 1, 2, . . . , i) indicates a constant, i indicates a finite value, and j indicates a finite value. The similarity of flows is not used in the formula (8). It is necessary to measure the air flow Q and the motor torque T at plural motor speeds ω. For this reason, more measurements are necessary to derive $K_{gh}$ in the formula (8), than to derive $K_n$ in the formula (4) and the formula (3). In addition, it is necessary to derive $K_{gh}$ in the formula (8), every time the impeller outer diameter of the fan is changed. However, according to the formula (8), the air flow Q can also be calculated based on the motor speed ω and the motor torque T.

The air flow calculation section 11 has been described above. Hereinafter, the operation and constituents of the speed command generation section 12 will be described.

The speed command generation section 12 generates the speed command ω* of the motor 3 such that the air flow Q coincides with the predetermined air flow command Q*. The speed command generation section 12 generates the speed command ω* cyclically and for example, 10 times per second. Although in the example of FIG. 1, the predetermined air flow command Q* is newly input outside the motor controller 8a, it is not necessarily input from outside the motor controller 8a in every cycle.

For example, the motor controller 8a may include an internal memory (not shown). This memory may store therein the predetermined air flow command Q* input outside the motor controller 8a, and update the predetermined air flow command Q* every time the predetermined air flow commands Q* is input from outside the motor controller 8a.

The predetermined air flow command Q* is not necessarily input from outside the motor controller 8a. For example, the internal memory of the motor controller 8a may store plural predetermined air flow commands Q* and the motor controller 8a may be manually operated to select a particular predetermined air flow command Q*.

Figure 2:
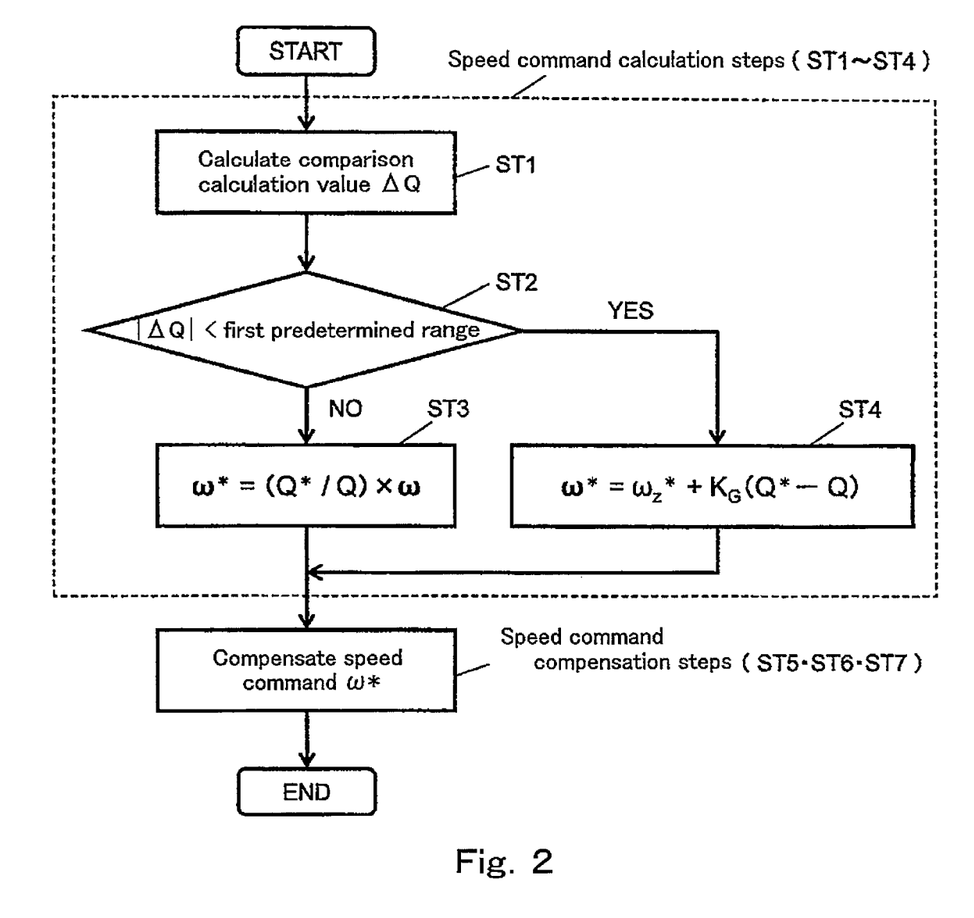
FIG. 2 is a flowchart showing the exemplary process of a speed command generation section 12 according to Embodiment 1 of the present invention.

FIG. 2 is a flowchart showing the exemplary process of the speed command generation section 12. The speed command generation section 12 generates the speed command ω* in two stages of first speed command calculation steps (step ST1 to step ST4) and subsequent speed command compensation steps (step ST5 to step ST7).

The speed command calculation steps (step ST1 to step ST4) calculate the speed command ω* such that the air flow Q coincides with the predetermined air flow command Q*. The speed command compensation steps (step ST5 to step ST7) compensate the calculated speed command ω* based on the motor speed ω, the motor torque T, and several predetermined values. Thus, the fan is operated stably.

Firstly, the speed command calculation steps (step ST1 to step ST4) will be described.

As shown in FIG. 2, initially, the motor controller 8a derives a comparison calculation value ΔQ of the predetermined air flow command Q* and the air flow Q calculated by the air flow calculation section 11, according to a formula (9) (step ST1).

$$\Delta Q = Q^* - Q \quad (9)$$

Note that the comparison calculation value is not necessarily defined by the difference differently from the formula (9). For example, the comparison calculation value may be defined by the ratio of Q* to Q. Nonetheless, in the present embodiment, the comparison calculation value ΔQ defined by the formula (9) is used.

Then, the motor controller 8a determines whether the comparison calculation value ΔQ falls within or outside a first predetermined range (step ST2). For example, a predetermined threshold is set and comparison is made as follows. When the absolute value of ΔQ exceeds the predetermined threshold, the motor controller 8a determines that the comparison calculation value ΔQ falls outside the first predetermined range, while when the absolute value of ΔQ is equal to or less than the predetermined threshold, the motor controller 8a determines that the comparison calculation value ΔQ falls within the first predetermined range.

When the comparison calculation value ΔQ falls outside the first predetermined range, the motor controller 8a generates the speed command ω* of the motor 3 according to a formula (10) (step ST3).

$$\omega^* = \frac{Q^*}{Q} \omega \quad (10)$$

ω indicates the motor speed of the motor 3, Q indicates the air flow of the fan 1, and Q* indicates the predetermined air flow command. According to the similarity of flows in which the air flow of the fan is proportional to the rotational speed of the fan, the motor speed ω* calculated according to the formula (10) is equal in value to the motor speed which realizes the air flow value of the predetermined air flow command Q*.

Therefore, even when the predetermined air flow command Q* changes significantly, the speed command ω* quickly changes into the value of the motor speed which realizes the air flow value of a new predetermined air flow command Q*. This allows the air flow Q to track the predetermined air flow command Q* at a high speed.

On the other hand, when the comparison calculation value ΔQ falls within the first predetermined range, the motor controller 8a generates the speed command ω* according to a formula (11) (step ST4).

$$\omega^* = \omega^*_z + K_G(Q^* - Q) \quad (11)$$

$\omega_z^*$ indicates the speed command output at a previous time from the speed command generation section 13, $K_G$ indicates a control gain (constant), Q indicates the air flow of the fan 1, and Q* indicates the predetermined air flow command. The formula (11) means that feedback control is performed by integral compensation. A change in an air conditioning environment is estimated in advance, and the value of the control gain $K_G$ is set to a sufficiently small value so that the air flow Q stably converges at the predetermined air flow command Q*.

Now, the functions and advantages of the speed command calculation steps (step ST1 to step ST4) configured as described above will be described.

If the speed command ω* is always generated according to the formula (11), irrespective of the comparison calculation value ΔQ, the air flow Q is allowed to stably converge, but the speed command ω* always changes gently. Because of this, when the predetermined air flow command Q* is changed significantly, a long time is required for the air flow Q to converge at the new predetermined air flow command Q*.

Instead, if the speed command ω* is always generated according to the formula (10), the calculated speed command ω* changes significantly, the air flow Q changes back and forth, crossing the predetermined air flow command Q*, which takes place repeatedly. Thus, it is likely that the air flow Q does not stably converge at the predetermined air flow command Q*.

In light of this, in the present embodiment, when the motor controller 8a determines that the difference between the air flow Q and the predetermined air flow command Q* is large based on the magnitude of the comparison calculation value ΔQ, the motor speed ω is changed significantly according to the formula (10), while when the motor controller 8a determines that the difference between the air flow Q and the predetermined air flow command Q* is small based on the magnitude of the comparison calculation value ΔQ, the motor speed ω is adjusted to be changed gently according to the formula (11). This allows the air flow Q to track the predetermined air flow command Q* at a high speed and stably converge at the predetermined air flow command Q*, even when the predetermined air flow command Q* changes significantly.

Figure 3:
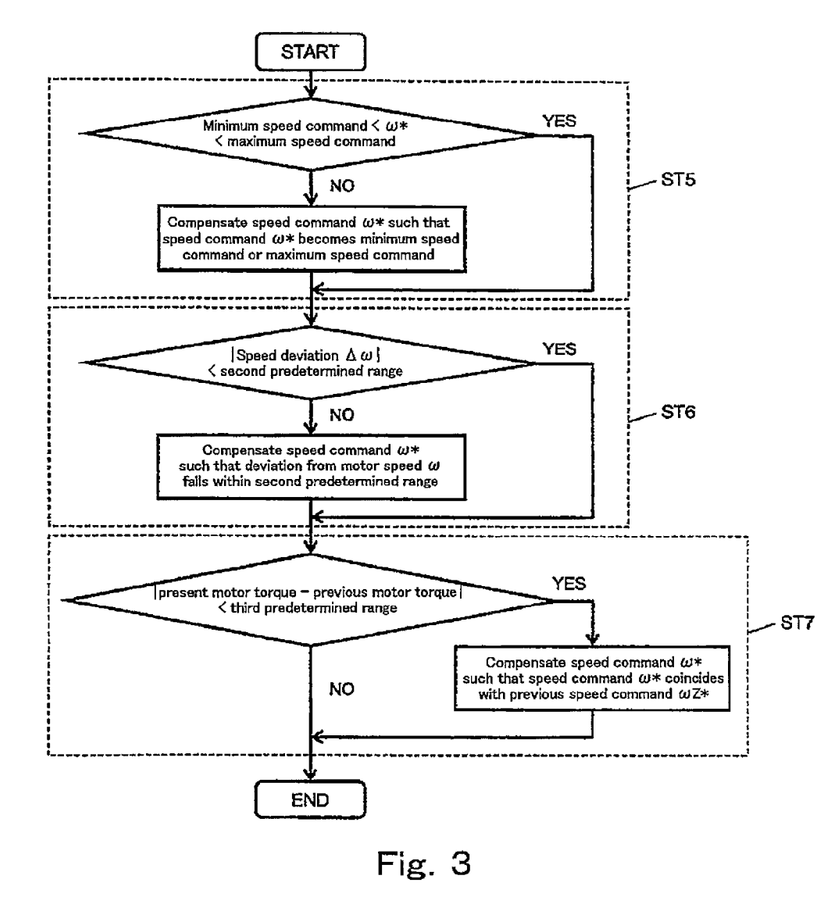
FIG. 3 is a flowchart showing the exemplary process of speed command compensation steps within the speed command generation section 12 according to Embodiment 1 of the present invention.

Next, the speed command compensation steps (step ST5 to step ST7) will be described. FIG. 3 is a flowchart of the exemplary process performed within the speed command compensation steps (step ST5 to step ST7) of FIG. 2.

As shown in FIG. 3, initially, the motor controller 8a determines whether or not the speed command ω* generated in the speed command calculation steps falls within a range between a predetermined minimum speed command and a predetermined maximum speed command. When the motor controller 8a determines that the speed command ω* falls within this range, it does not compensate the speed command ω*. When the motor controller 8a determines that the speed command ω* is smaller than the predetermined minimum speed command, it compensates the speed command ω* such that the speed command ω* becomes the predetermined minimum speed command. When the motor controller 8a determines that the speed command ω* exceeds the predetermined maximum speed command, it compensates the speed command of such that the speed command ω* becomes the predetermined maximum speed command (step ST5).

The advantages of step ST5 will be described.

For example, in a certain air conditioning environment, such as a case where the pressure in the air flow passage 2 is low, the magnitude of the motor speed ω required to obtain the air flow value of the predetermined air flow command Q* may not be so large. In such an air conditioning environment, the motor speed ω becomes extremely low.

In this case, if a rapid state change takes place in the motor 3 or the air flow passage 2, the speed command ω* is in some cases calculated transiently as a negative value depending on the value of the constant $K_n$ of the formula (3). In this case, the fan 1 rotates in a reverse direction. According to the reverse rotation of the fan 1, a suction operation takes place, and a user may misunderstand that the fan 1 has an abnormality. To avoid such a situation, the predetermined minimum speed command as a lower limit value is set in the speed command ω*. In this way, the reverse rotation can be prevented.

On the other hand, in a case where the pressure in the air flow passage 2 is high, the magnitude of the motor speed ω becomes an excessively large value. In this case, it is likely that control becomes unstable due to an attempt to realize the operation which is beyond the motor's capability, or the fan or the motor vibrates highly due to the high-speed rotation of the motor 3 and hence fails. To avoid such a situation, the predetermined maximum speed command as an upper limit value is set in the speed command ω*. In this way, it becomes possible to prevent a situation in which control becomes unstable, or the fan or the motor fails.

Then, the motor controller 8a calculates a speed deviation Δω which is a difference between the speed command ω* and the motor speed ω according to a formula (12). When the speed deviation Δω falls within a second predetermined range, the motor controller 8a does not compensate the speed command ω*, while when the speed deviation Δω falls outside the second predetermined range, the motor controller 8a compensates the speed command ω* such that the speed deviation Δω falls within the second predetermined range (step ST6).

$$\Delta\omega = \omega^* - \omega \qquad (12)$$

In an exemplary compensation method, a predetermined positive limiting magnitude (range) L is set, (ω+L) which is a sum of the motor speed ω and L is set as an upper limit value, (ω−L) obtained by subtracting L from the motor speed ω is set as a lower limit value, the speed command ω* is compensated so as to become the upper limit value (ω+L), when the speed command ω* exceeds the upper limit value (ω+L), while the speed command ω* is compensated so as to become the lower limit value (ω−L), when the speed command ω* is smaller than the lower limit value (ω−L).

The advantages of step ST6 will be described. If the motor speed ω is changed rapidly, the air flow Q calculated by the air flow calculation section 11 is deviated from an actual air flow due to a transient change in the motor torque T or the pressure in the air flow passage 2, so that the air flow cannot be stably controlled. To avoid such a situation, the second predetermined range is set in the changing magnitude of the speed command ω* to prevent a rapid change in the motor speed ω. In this way, it becomes possible to prevent a situation in which control becomes unstable due to the deviation of the air flow Q.

Then, the motor controller 8a compares the motor torque T obtained at a present time to the motor torque T obtained at a previous time. When its difference falls within a third predetermined range, the motor controller 8a determines that a change in the motor torque T is less, and compensates the speed command ω* such that this speed command ω* coincides with the speed command $\omega_z^*$ output at a previous time from the speed command generation section 13 (step ST7).

The advantages of step ST7 will be described. If an attempt is made to change the speed command ω* according to a slight change in the motor torque T without performing step ST7, the speed command ω* will track the slight change in the motor torque T and oscillate, so that the air flow Q will change back and forth, crossing the air flow value of the predetermined air flow command Q*, which takes place repeatedly for a long time. Thus, the air flow Q does not stably converge at the predetermined air flow command Q*. For this reason, a dead zone for detection of the torque is set as the third predetermined range, to prevent the speed command ω* from oscillating in a range near a convergence point, thereby allowing the air flow Q to stably converge at the predetermined air flow command Q*.

Figure 4:
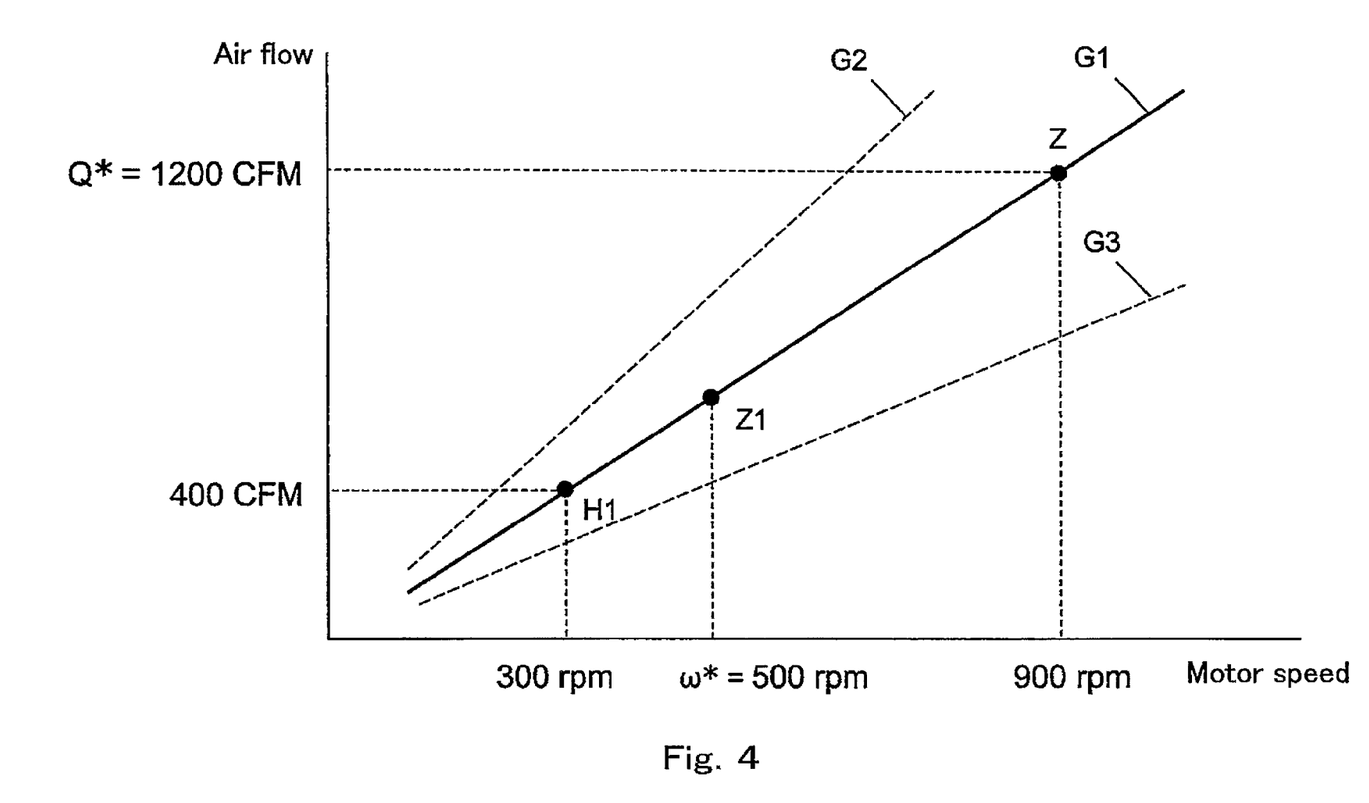
FIG. 4 is a view showing the exemplary air flow control performed by a motor controller 8a according to Embodiment 1 of the present invention.
Figure 5:
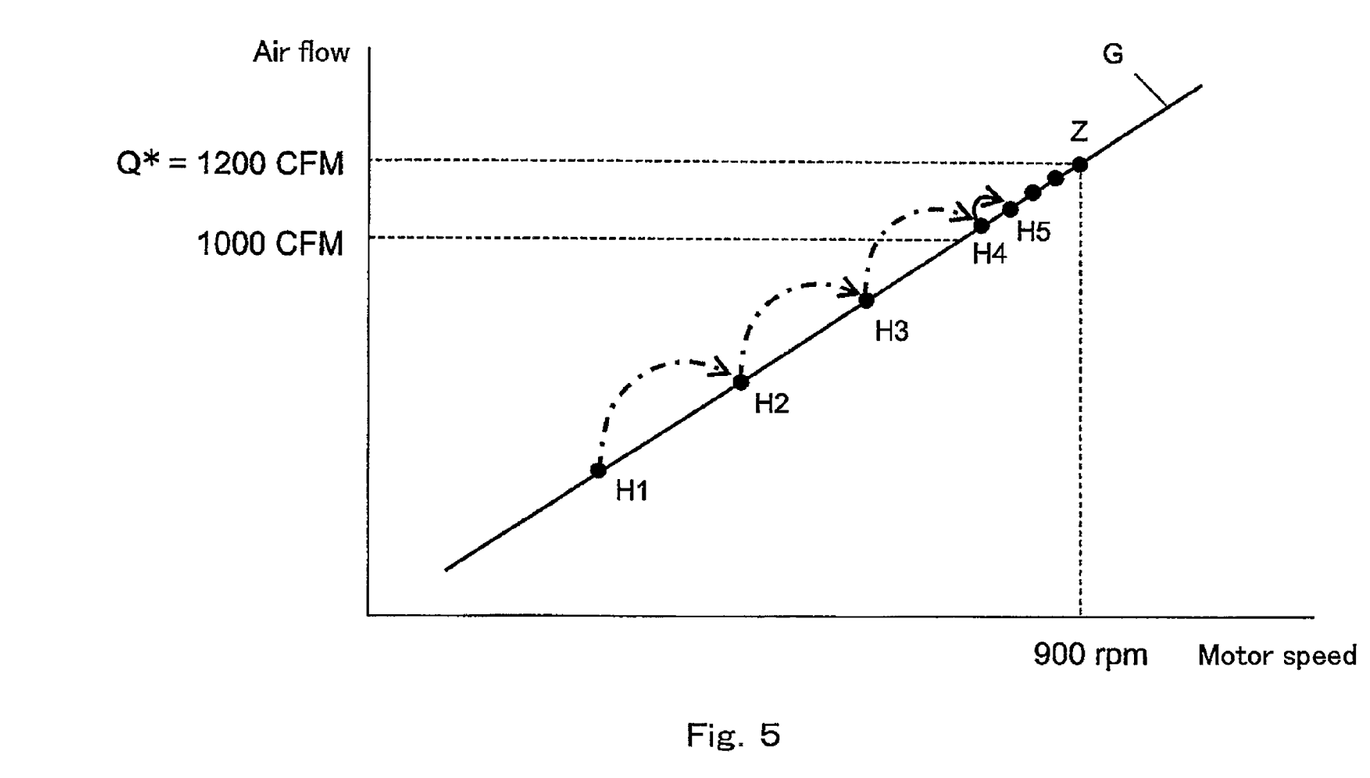
FIG. 5 is a view showing the exemplary air flow control performed by the motor controller 8a according to Embodiment 1 of the present invention.

The operation of the motor controller 8a configured as described above will be described below, with reference to FIGS. 4 and 5. FIGS. 4 and 5 are views showing the exemplary air flow control performed by the motor controller 8a according to Embodiment 1 of the present invention. In FIGS. 4 and 5, each of a line (straight line) G1, a line (straight line) G2, and a line (straight line) G3 indicates the relationship between the motor speed ω and the air flow Q in a corresponding air conditioning environment. The slope of the line is varied depending on the air-conditioning environment such as the shape of the air flow passage 2 or the state of the vent provided in an air outlet.

Now, it is assumed that the fan 1 is driven (activated) in the air conditioning environment indicated by the line G1, and an operation point is a point H1. At this time, the fan 1 blows the air flow of 400CFM through the air flow passage 2, and the motor speed is 300 rpm.

Hereinafter, a change in the operation point in a case where 1200CFM is given as the predetermined air flow command Q* will be described. The first predetermined range of step ST2 of the speed command generation section 12 is an absolute error 200CFM, and the second predetermined range of step ST6 of the speed command generation section 12 is an absolute error 200 rpm.

Initially, the air flow calculation section 11 calculates the air flow 400CFM at the operation point H1. Then, the speed command calculation steps (step ST1 to step ST4) of the speed command generation section 12 calculate the speed command $\omega^*$. At this time, the comparison calculation value $\Delta Q$ calculated according to the formula (9) is 800CFM and exceeds the absolute error 200CFM which is the first predetermined range. Therefore, process moves from step ST2 to step ST3.

Step ST3 calculates the speed command $\omega^*$ as (1200/400)×300=900 [rpm], according to the formula (10). Therefore, at this time, a point Z in FIG. 4 becomes a target operation point.

Then, the speed command compensation steps (step ST5 to step ST7) compensate the speed command $\omega^*$. The speed deviation $\Delta\omega$ calculated according to the formula (12) of step ST6 is 600 rpm and exceeds the absolute error 200 rpm which is the second predetermined range. Therefore, step ST6 compensates the speed command $\omega^*$ such that the speed command $\omega^*$ becomes an upper limit value 500 rpm which is a sum of a present motor speed 300 rpm and the predetermined absolute error 200 rpm. As a result of the above, the target operation point is compensated to be shifted from the point Z to the point Z1 in FIG. 4.

The speed command generation section 12 outputs the speed command 500 rpm generated as described above, and the motor driving control section 5a controls the driving voltage of the motor 3 so that the motor speed coincides with the speed command 500 rpm. The motor controller 8a generates the speed command $\omega^*$ cyclically, and the motor driving control section 5a controls the speed of the motor 3 based on the speed command $\omega^*$ updated cyclically. This is repeated, and as a result, the operation point is shifted to H2, and to H3 of FIG. 5.

In the example of FIG. 5, when the air flow Q reaches a point H4 which exceeds 1000CFM, the comparison calculation value $\Delta Q$ becomes smaller than the absolute error 200CFM which is the first predetermined range. Therefore, differently from the process corresponding to the operation point H3 and the preceding operation points, the speed command $\omega^*$ is calculated by step ST4. The control gain $K_G$ of the formula (11) used in step ST4 is set to a sufficiently small value, and hence the speed command $\omega^*$ changes gently. Therefore, as shown in FIG. 5, the operation point is shifted a little by little, like H4, H5, . . . . , and stably converges at the target operation point Z.

As described above, the motor controller 8a of the present embodiment includes the air flow calculation section 11 which calculates the air flow Q of the fan based on the motor speed $\omega$ and the motor torque T, and the speed command generation section 12 which generates the speed command $\omega^*$ of the motor such that the air flow Q coincides with the predetermined air flow command $Q^*$ based on the comparison calculation value $\Delta Q$ of the air flow Q and the predetermined air flow command $Q^*$, and the speed command generation section 12 generates as the speed command $\omega^*$ a value obtained by multiplying the motor speed $\omega$ by the ratio of the predetermined air flow command $Q^*$ with respect to the air flow Q when the comparison calculation value $\Delta Q$ falls outside the first predetermined range, and generates as the speed command $\omega^*$ a value obtained by integrating the difference between the air flow Q and the predetermined air flow command $Q^*$ when the comparison calculation value $\Delta Q$ falls within the first predetermined range.

In the above configuration, when the difference $\Delta Q$ between the air flow Q and the predetermined air flow command $Q^*$ is large, the air flow Q is allowed to track the predetermined air flow command $Q^*$ at a high speed, while when the difference $\Delta Q$ between the air flow Q and the predetermined air flow command $Q^*$ is small, the air flow Q is allowed to converge at the predetermined air flow command $Q^*$ gently and stably.

As described above, by changing the generation method of the speed command $\omega^*$ according to the difference $\Delta Q$ between the air flow Q and the predetermined air flow command $Q^*$, the air flow Q is allowed to track the predetermined air flow command $Q^*$ at a high speed, and converge at the predetermined air flow command $Q^*$ stably, even when the predetermined air flow command $Q^*$ changes significantly.

(Embodiment 2)

Figure 6:
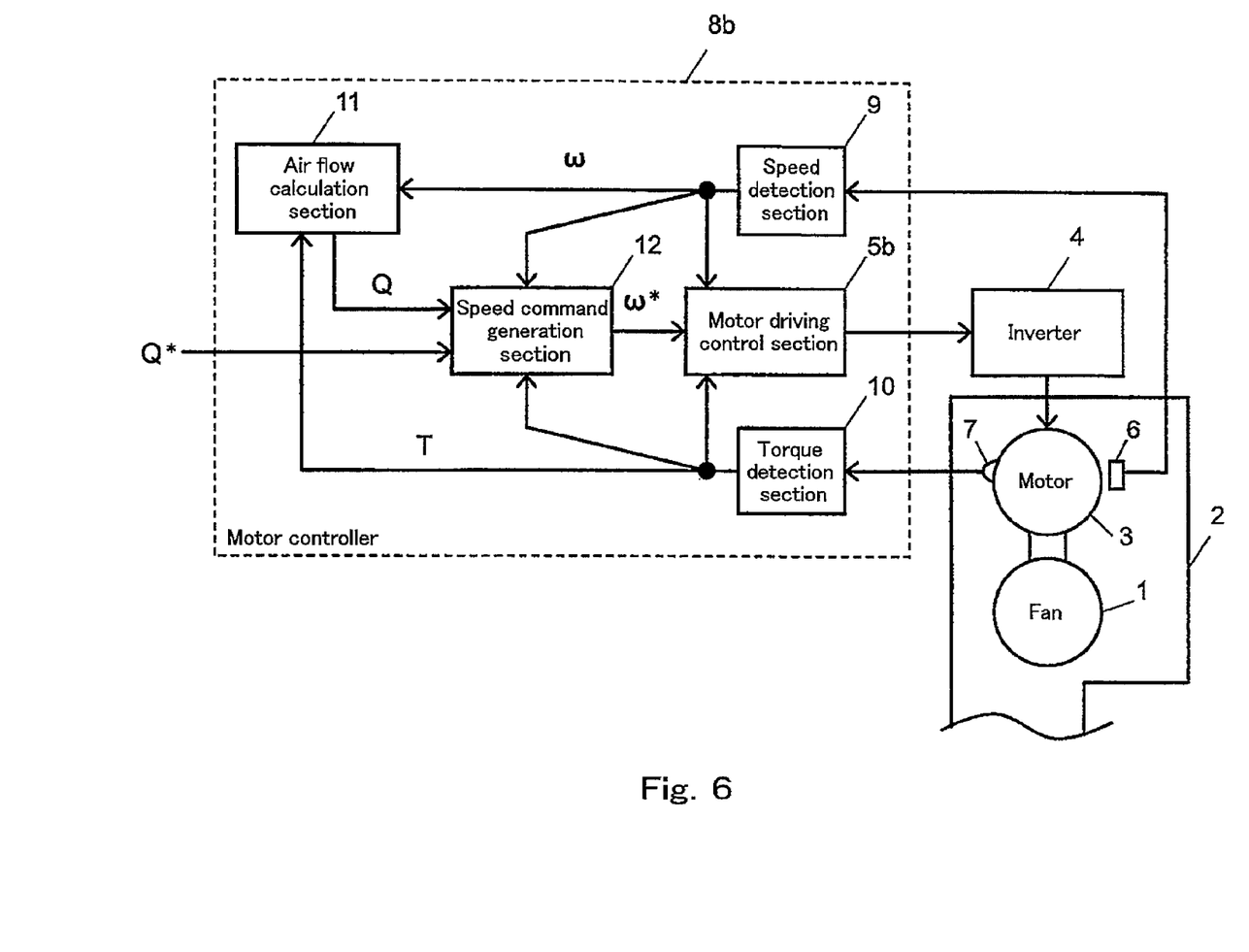
FIG. 6 is a block diagram showing the exemplary configuration of a motor control system including a motor controller according to Embodiment 2 of the present invention.

FIG. 6 is a block diagram showing the exemplary configuration of a motor control system including a motor controller according to Embodiment 2 of the present invention. In the present embodiment, the motor driving control section 5a of Embodiment 1 of FIG. 1 is replaced by a motor driving control section 5b of FIG. 6, and the motor controller 8a of Embodiment 1 of FIG. 1 is replaced by a motor controller 8b of FIG. 6.

In the example of FIG. 1, the motor driving control section 5a is provided outside the motor controller 8a, while in the example of FIG. 6, the motor driving control section 5b is provided within the motor controller 8b.

The operation of the motor driving control section 5b and the operation of the motor controller 8b are the same as the operation of the motor driving control section 5a and the operation of the motor controller 8a of Embodiment 1 and will not be described repeatedly. The other constituents are the same as those of Embodiment 1 and will not be described repeatedly.

In the present embodiment, with the above configuration, the functions and advantages similar to those of Embodiment 1 can be achieved. In addition, in the present embodiment, the motor controller 8b contains the motor driving control section 5b. Therefore, without separately providing a device for controlling the inverter 4, the motor 3 can be controlled so that the air flow Q of the fan 1 tracks the predetermined air flow command $Q^*$ by directly outputting a control signal to the inverter 4.

Next, alternative configuration of the present invention which is common to Embodiment 1 and Embodiment 2 will be described.

The control method of the motor is a speed control method. Therefore, the speed command $\omega^*$ becomes substantially equal to the motor speed $\omega$ so long as the speed command $\omega^*$ does not change so steeply. Therefore, a formula (13) may be used instead of the formula (10) used in step ST3 in the flowchart of the process of the speed command generation section 12 of FIG. 2, or a formula (14) may be used instead of the formula (11) used in step ST4 in the flowchart of the process of the speed command generation section 12 of FIG. 2.

$$\omega^* = \frac{Q^*}{Q}\omega_z^* \tag{13}$$

$$\omega^* = \omega + K_G(Q^* - Q) \tag{14}$$

$\omega_z^*$ indicates the speed command output at a previous time from the speed command generation section 12.

INDUSTRIAL APPLICABILITY

A motor controller and a motor control method of the present invention are optimal to a system which controls an air flow such that the air flow becomes a predetermined air flow value, and is useful as air conditioning equipment in general houses, business buildings, vehicles, etc.

The invention claimed is:

1. A motor controller for controlling a motor which drives a fan, the motor controller comprising:
    an air flow calculator configured to obtain speed information indicative of a motor speed at which the motor is running and torque information indicative of a motor torque which the motor is outputting and calculate an air flow of the fan from the motor speed and the motor torque; and
    a speed command generator configured to generate a speed command given to rotate the motor at a target motor speed,
    wherein the speed command generator is configured to:
        receive an air flow command directing a target air flow;
        compare the target air flow and the calculated air flow; and
        upon a determination that a difference between the target air flow and the calculated air flow falls outside a first predetermined range, perform a first speed command calculation in which a ratio between the target air flow and the calculated air flow is multiplied by the motor speed to derive the speed command, which directs the motor to rotate at the target motor speed.

2. The motor controller according to claim 1, wherein the speed command generator is further configured to perform a second speed command calculation in which the difference between the target air flow and the calculated air flow is used to derive the speed command to direct the motor to rotate at the target motor speed when the difference between the target air flow and the calculated air flow falls within the first predetermined range.

3. The motor controller according to claim 1, further comprising a motor driving controller configured to generate a signal used for controlling a driving voltage to the motor in such a way that the motor speed will track the target motor speed.

4. The motor controller according to claim 1, wherein the speed command generator is configured to integrate a difference between the target air flow and the calculated air flow to derive the, when the difference between the target air flow and the calculated air flow falls within the first predetermined range.

5. The motor controller according to claim 1, wherein the speed command generator is configured to multiply, by a gain, a difference between the target air flow and the calculated air flow and add the motor speed to the result of multiplication to derive the target motor speed when the difference between the target air flow and the calculated air flow falls within the first predetermined range.

6. The motor controller according to claim 1, wherein the speed command generator is configured to update the target motor speed at intervals, the speed command generator being configured to replace the speed command derived by the first speed command calculation when a difference between motor toque values falls within a predetermined torque range.

7. The motor controller according to claim 1, wherein the speed command generator stores a minimum motor speed and a maximum motor speed and configured to adjust the target motor speed to fall within a range between the minimum and the maximum motor speeds.

8. The motor controller according to claim 1, wherein the flow calculator is configured to divide the motor torque with a square of the motor speed and multiply the motor speed with the result of the division.

9. The motor controller according to claim 1, further comprising a first detector configured to detect the motor speed and output the speed information.

10. The motor controller according to claim 1, further comprising a second detector configured to detect a current flowing through the motor and output the torque information.

11. A method of controlling a motor which drives a fan, the method comprising:
    obtaining speed information indicative of a motor speed at which the motor is running and torque information indicative of motor torque which the motor is outputting;
    calculating an air flow of the fan from the motor speed and the motor torque;
    receiving an air flow command directing a target air flow;
    comparing the target air flow and the calculated air flow;
    upon a determination that a difference between the target air flow and the calculated air flow falls outside a first predetermined range, perform a first speed command calculation in which a ratio between the target air flow and the calculated air flow is multiplied by the motor speed to derive the speed command, which directs the motor to rotate at the target motor speed; and
    controlling the motor with the derived speed command in such a way that the fan will output the target air flow.

* * * * *